United States Patent [19]
Wilcox et al.

[11] Patent Number: 5,142,502
[45] Date of Patent: Aug. 25, 1992

[54] MICROCOMPUTER-BASED SIDE SCANNING SONAR SYSTEM

[76] Inventors: Martin H. Wilcox, Route 4, Box 1691, Gloucester, Va. 23061; Donald M. Scott, 2516 Kensington Ave., Richmond, Va. 23220

[21] Appl. No.: 765,930
[22] Filed: Sep. 24, 1991
[51] Int. Cl.⁵ ............................................. G01S 15/00
[52] U.S. Cl. .................................................. 367/88
[58] Field of Search ........................................ 367/88

[56] References Cited
U.S. PATENT DOCUMENTS

| | | | |
|---|---|---|---|
| 4,244,036 | 1/1981 | Raven | 367/88 |
| 4,262,344 | 4/1981 | Gilmour | 367/88 |
| 4,287,578 | 9/1981 | Heyser | 367/88 |
| 4,751,645 | 6/1988 | Abrams et al. | 367/88 |

Primary Examiner—Daniel T. Pihulic
Attorney, Agent, or Firm—Raymond L. Greene

[57] ABSTRACT

A microcomputer-based side scanning sonar system is provided. The system uses a personal microcomputer with a custom designed control and data collection circuit card to provide integrated sonar and navigational data to a display. A specialized software program allows navigational data to be collected from any standard navigational device compatible with NMEA 0183 standards and integrated with sonar data. The system allows accurate and repeatable navigation to sonar targets, including return to the target.

18 Claims, 6 Drawing Sheets

MICROCOMPUTER-BASED SIDE SCANNING SONAR SYSTEM

BACKGROUND OF THE INVENTION

1. Technical Field of the Invention

The invention is related to the technical field of sonar scanning and more particularly to the use of personal microcomputers in sonar systems.

2. Description of Prior Art

Existing technology typically makes use of dedicated computers for sonar system control and display. These dedicated computers are ordinarily operated using firmware in programmable read only memory (PROM) chips. Display of sonar data using both wider display and paper recording mechanisms is known in the art. Existing sonar display devices also permit the display of navigational information from commercially available navigation systems. However data provided is simple latitude-longitude text readouts. Although some sonar systems are capable of simultaneously displaying both sonar data and navigation references, the displays are merely superimposed and do not provide graphical correlation of position and sonar data. Navigating to a sonar-identified mark conventionally requires the ship operator to keep a record of the ship's track, either manually or by use of a digital plotter, and then to estimate the time of sonar passage of a site of interest, and using the estimated time, calculate the latitude and longitude of the site. The operator then must calculate the relative position between the ship and the identified site and perform a manual navigation to the site separate from any sonar operations.

In addition to the lack of navigational data integration, current systems have a number of other deficiencies. Dedicated computer systems using firmware for computer operations are both expensive and inflexible in software modifications. The dedicated nature of the computer also causes a much slower upgrade cycle on the hardware itself. As a result, current sonar systems are both expensive and obsolete compared to state of the art general purpose computer systems.

SUMMARY OF THE INVENTION

Accordingly, it is an object of the present invention to provide a side-scanning sonar system having software controlled scanning and display.

It is another object of the present invention to provide a side-scanning sonar system having integrated sonar and navigational data.

It is a further object of the present invention to provide a side-scanning sonar system having real time site location ability.

It is yet another object of the present invention to provide a side-scanning sonar system using a general purpose microcomputer for system control and operation.

The invention is a microcomputer-based side scanning sonar system using a custom interface circuit card and specialized software to control, drive, read and display sonar signals. The software uses navigational data from conventional sources or manually provided data to control sonar signal timing and other parameters. Operator selection of range and scan sector is also software controlled. A control box provides a functional link between the custom-configured computer and the sonar fish providing operating power to the fish and ping command along a single electrical wire. This electrical wire and a second wire are provided for return of sonar data from the fish.

BRIEF DESCRIPTION OF THE DRAWINGS

The above and numerous other objects of the invention that may be achieved by the method and preferred embodiment of the invention will be more readily understood from the following detailed description and the appended drawings wherein.

DETAILED DESCRIPTION OF THE INVENTION

Figure 1:
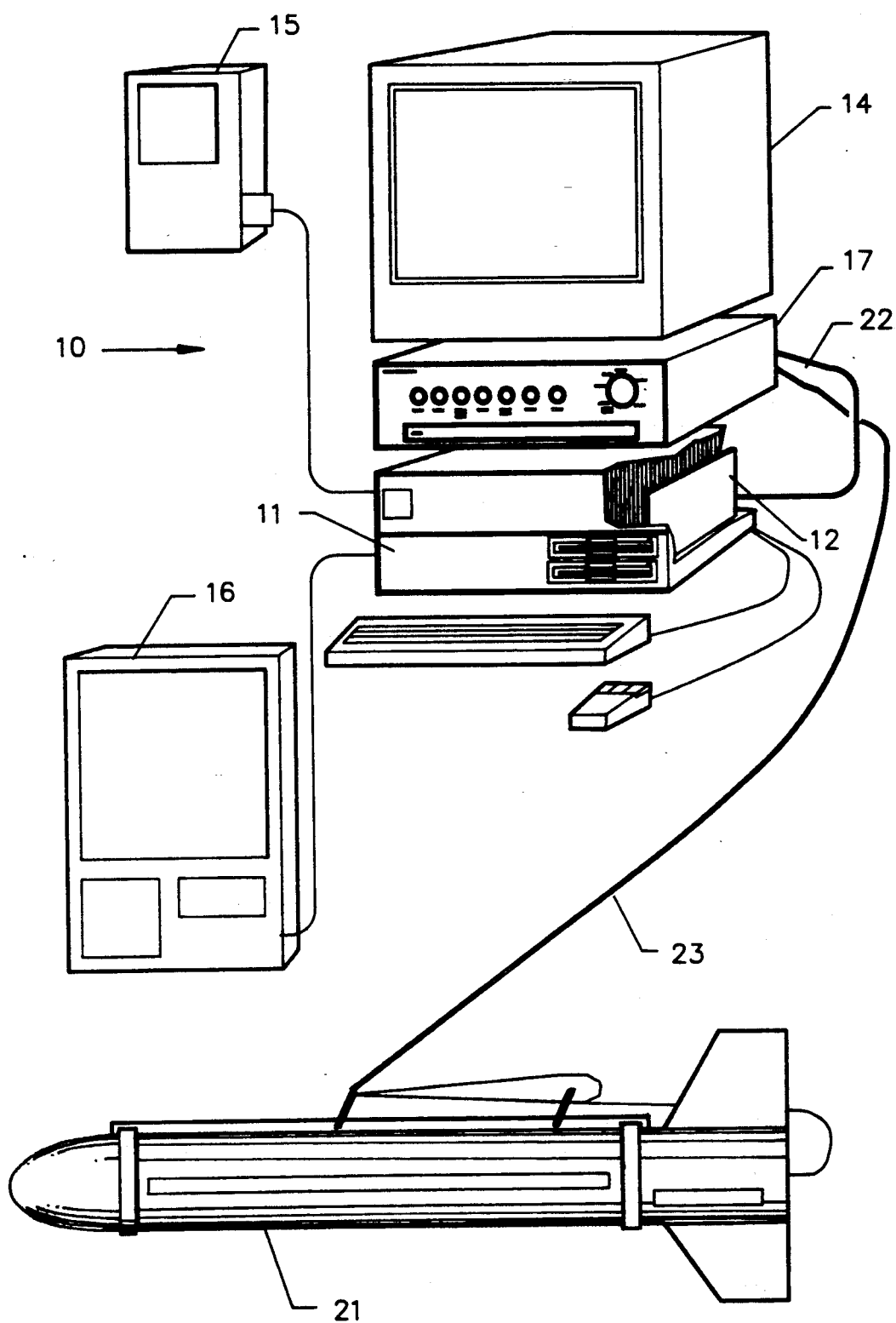
FIG. 1 is a functional diagram of the Side Scanning Sonar System.

Referring now to FIG. 1, the side-scanning sonar system of the present invention, designated generally by the reference numeral 10, showing the relationship of functional elements. The heart of the system is the personal computer 11 with a custom circuit card 12 providing the interface for the sonar scanners. The computer 11 is a commercially available microcomputer which may be any one of several suitable machines providing 16-bit bus. In the preferred embodiment the microcomputer is an Apple IIGS TM. Commercially available peripheral equipment may be connected to the microcomputer 11 including navigational devices 15 and data recording equipment 16. Navigational devices 15 can be selected from among commercially available devices conforming to the National Marine Electronics Association standard 0183 (NMEA 0183). These available devices include, but are not limited to LORAN, DECCA, OMEGA and Global Positioning System (GPS) receivers.

Neither hardware nor interfaces are novel with respect to the microcomputer and peripherals. However, the integration of navigational data with sonar data using the Sea Scan TM software is a novel feature.

The microcomputer 11 also includes a novel circuit card 12 which provides an interface between the computer and the sonar scanners. This circuit card is connected to the scanners through control box 17 by the interface cable 22. The control box provides 28 volt DC power and ping commands to the sonar tow fish 21. A single wire in cable 23 delivers both power and a multiplexed ping command. This wire and a second wire in the cable 23 provide a path for returning sonar data. In an alternate embodiment, a single coaxial cable could be used for the complete data path by multiplexing the right and left data channels. Upon being processed by the microcomputer 11, the sonar image data is displayed on the computer display 14. A cable handling system may be provided for reeling the towfish in or out. In the preferred embodiment when using less than approximately 100 meters of cable, a simple reel outfitted with a slip-ring assembly was employed. Likewise, towfish 21 is a commercially available sonar towfish.

Figure 2:
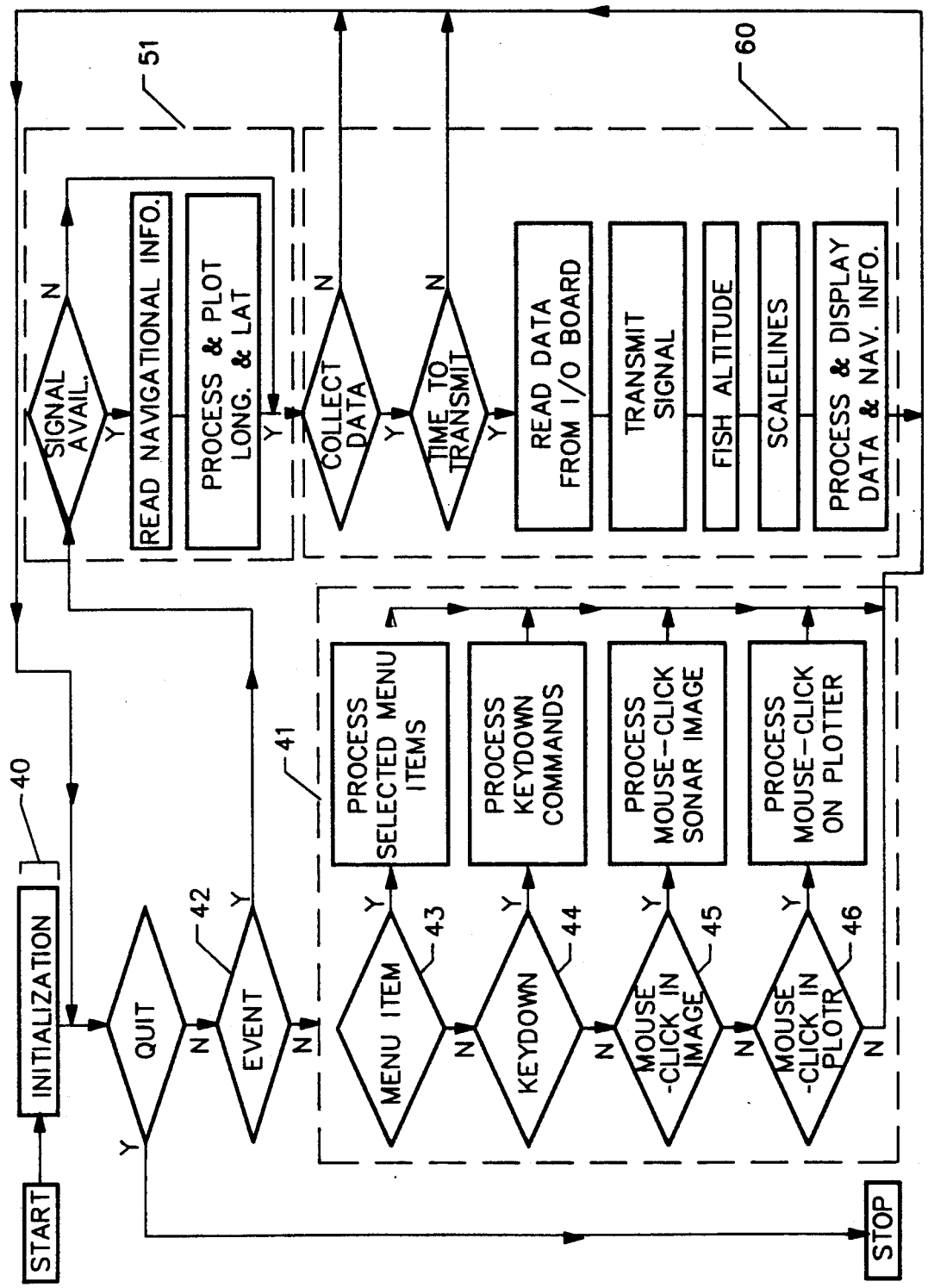
FIG. 2 is a software flowchart.

Reference is now made to FIG. 2 wherein the Sea Scan TM software flow chart is shown. Implementation of the Sea Scan TM software program is intended to: allow operator control of sonar system parameters;

correlate navigational data and sonar data automatically; and provide self-adjusting or manual control of ping commands. Implementation of these three functions has been accomplished by providing three functional loops. An operator selection loop 41 depicts the main sequence of events after system start up and the initialization 40 has occurred. When events occur in the operator selection loop 41, navigation and sonar input operations are temporarily suspended by event switch 42. The software program suspends these operations in four operator events: menu selection 43; key-down commands 44; mouse clicks 45 in the sonar image; or mouse clicks 46 in the plotter. Menu selections allow the operator to: control the sonar data collection process; set parameters to plot ship's location and estimated swath coverage on the graphical plotter; zoom in on the sonar image for increased lateral resolution; and print and save the sonar image with the related navigational information.

The basic function of the Sea Scan TM software is to display the sonar image on the screen and to integrate that data with navigational data. The navigational data is plotted on a graphical plotter that operates continuously in the background as the sonar data is collected. Each time the sonar towfish pings (emits an acoustic pulse) the reflection data is recorded and displayed along a horizontal line on the display 14. The towfish continuously pings as it passes over the seafloor and the seafloor image is built by drawing the reflection data line by line. The reflection data is recorded in a 400 line circular buffer. This means at least 400 lines of the sonar record are stored in computer memory. When a new sonar line is recorded it writes over the oldest sonar line. Approximately half of these lines (176 lines) are displayed on the screen at one time. The operator may review older lines (177 to 400) by scrolling up (and back down) the screen with the arrow scroll keys on the keyboard. Position and orientation are also recorded for each recorded sonar line thus providing an estimated latitude-longitude position for all points along the scanned sonar line. Subsequently, every point in the recorded sonar image may be easily and immediately correlated with a known and absolute latitude and longitude position.

The operator may mouse click 45 a sonar feature in the sonar data thereby establishing a navigation fix on the graphical plotter for the sonar feature. Since the latitude, longitude and orientation of every sonar line is recorded, the latitude and longitude of the selected feature along the sonar line may be calculated and this position is automatically marked on the plotter.

In operation, the menu selection, key down command and mouse clicks allow the operator to set supervisory control and display settings such as swath width, ping rate control and display modes. The Sea Scan TM 1000 may be configured for different operating requirements. The following are examples of the operator controls available in the event loop. Using keyboard commands the operator may select from a range of available swath widths. The operator may also set the Sea Scan TM to automatically control the ping rate of the towfish, based on the input navigational information, to compensate for speed variations. The ping rate may also be controlled manually by the operator using up and down arrows on the keyboard. Using menu selection 43 the operator may toggle the display of the background plotter. When the plotter, which displays the ship's track and estimated swath width coverage, is brought to the front it is shown as a split screen with the incoming sonar data.

Loop 51 provides for navigational data to be read from a commercially available navigational device. Data, in the form of latitude-longitude and course, are stored in the computer memory and correlated with sonar data. The speed-over-ground data may be used to automatically control the ping rate of the towfish.

Loop 60 provides the sonar data collection process. The collect data switch is enabled by an operator menu selection 43. The time to transmit (ping) switch is enabled when a specific duration of time has elapsed since the previous time to transmit was enabled. This specific duration of time is calculated with the previously read navigational information, specifically the speed-over-ground, the swath width and other parameters. This timing, based on speed-over-ground compensation, may be controlled automatically by the incoming navigational information, or manually by the operator with the keyboard as stated above. This speed compensated timing ensures a one-to-one aspect ratio on the returned sonar data, that is the ping rate is automatically adjusted so that true proportions of length and width are shown on the sonar display regardless of boat speed.

When time to transmit occurs, the current sonar data is read from the buffer on the circuit card and stored in computer memory (replacing the oldest of the 400-line display). The coded signal to transmit the acoustic pulse is sent to the circuit card. The towfish altitude is then calculated from the current sonar data, scale lines are added as necessary, and the current sonar data is then processed for display on the display.

Figure 3:
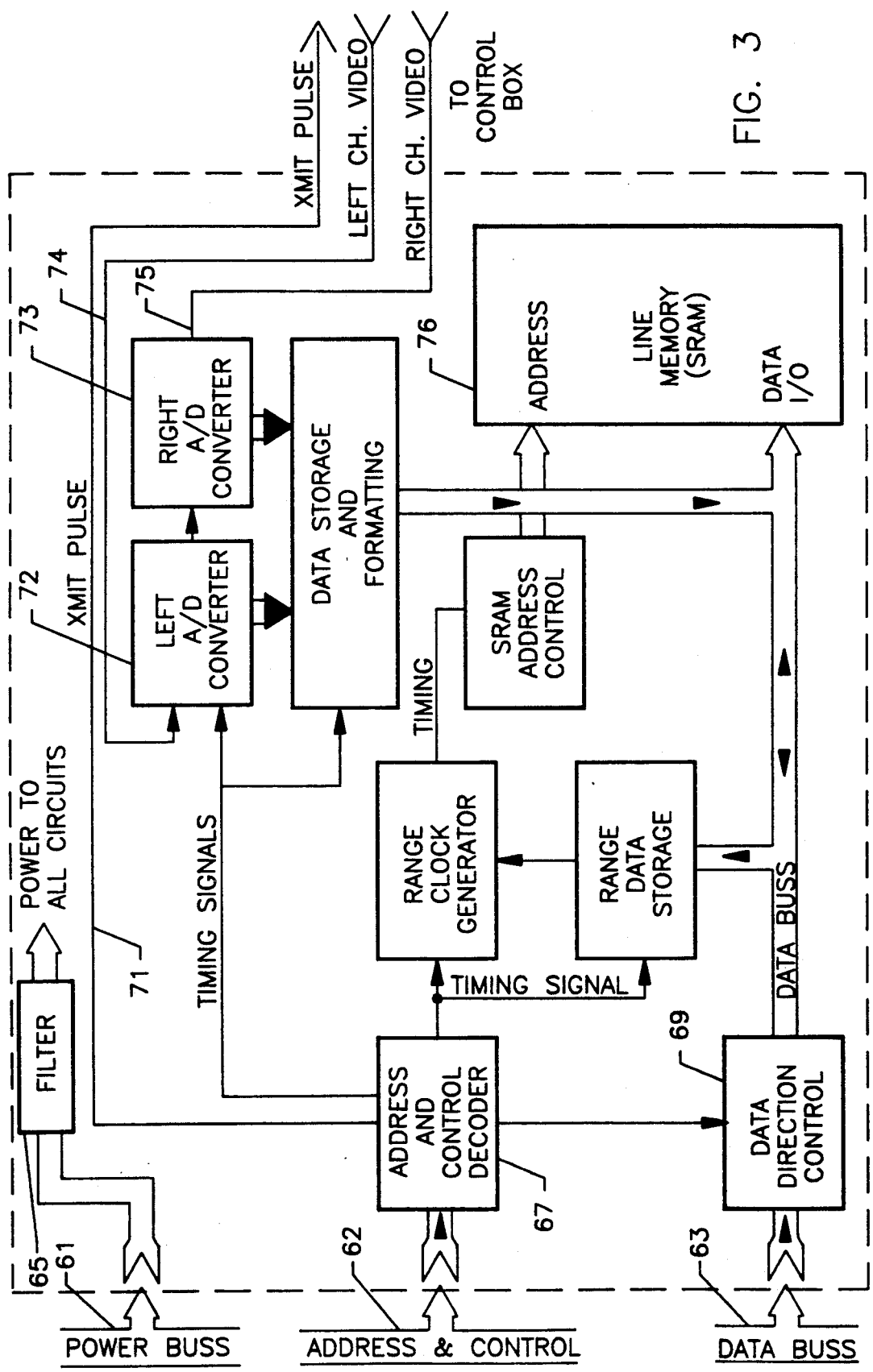
FIG. 3 is a block diagram of the custom interface circuit card.

Referring now to FIG. 3, the functional components of the custom configured circuit board is shown. Three basic interfaces operate the circuit board, the power bus 61, address bus and bus control 62 and the data bus 63. Three address registers are used with sixteen available in the preferred embodiment. Filter 65 provides filtered power to all circuits. Address and control decoder 67 determines whether data is read or written in conjunction with Data Direction Control element 69. In the event a transmit pulse is called for Address & Control Decoder 67 sends a transmit pulse along line 71. Simultaneously a timing signal is sent to the left analog-to-digital convertor 72 and the right analog-to-digital converter 73. Lines 74 and 75 are data return lines for sonar data returning to the computer. That data is stored in the Static RAM 76 until the software reads the sonar data from this memory. The data is transferred along the Data Bus 63.

Figure 4:
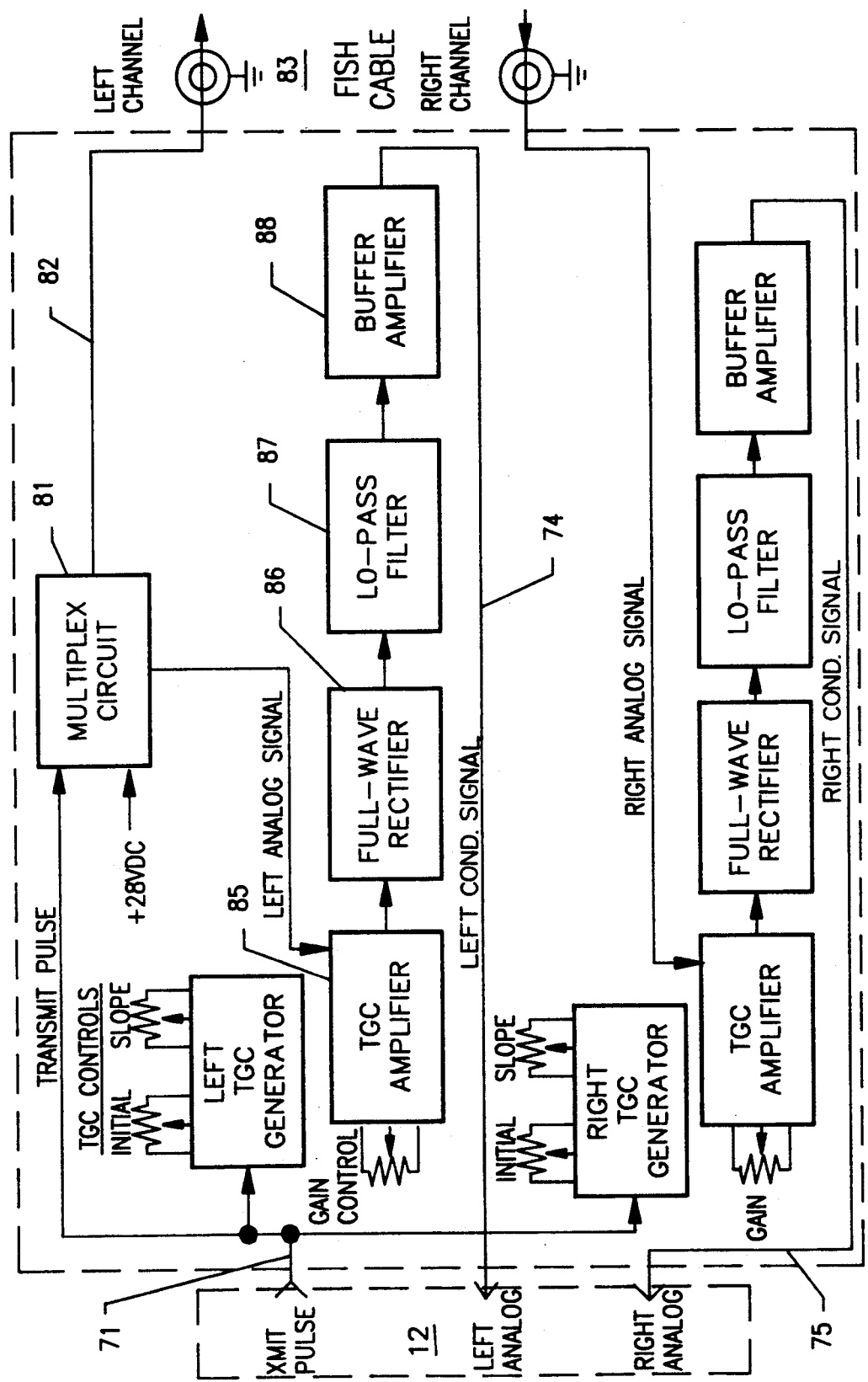
FIG. 4 is a block diagram of the control box.

Referring now to FIG. 4, the functional diagram of the control box shows the transmit signal entering the box on line 71. The transmit pulse is routed through multiplex circuit 81 where 28 volt DC power is combined with the transmit pulse. The multiplexed signal continues on line 82 to the cable 83 to the sonar towfish or other emitter 83. Line 82 is a coaxial cable with return sonar data returning to the multiplex circuit 81 and then to the Time-Gain Compensation (TGC) amplifier 85. This amplifier compensates for gain losses caused by longer ranges. The series of signal conditioners, full-wave rectifier 86, low-pass filter 87 and buffer amplifier 88 condition the return signal to provide an analog signal along line 74 for digitizing on the circuit card 12 of the left side of the sonar data. A similar process occurs on the right side as shown. The conditioned signal for the right side is returned to the circuit card 12 along line 75.

Figure 5:
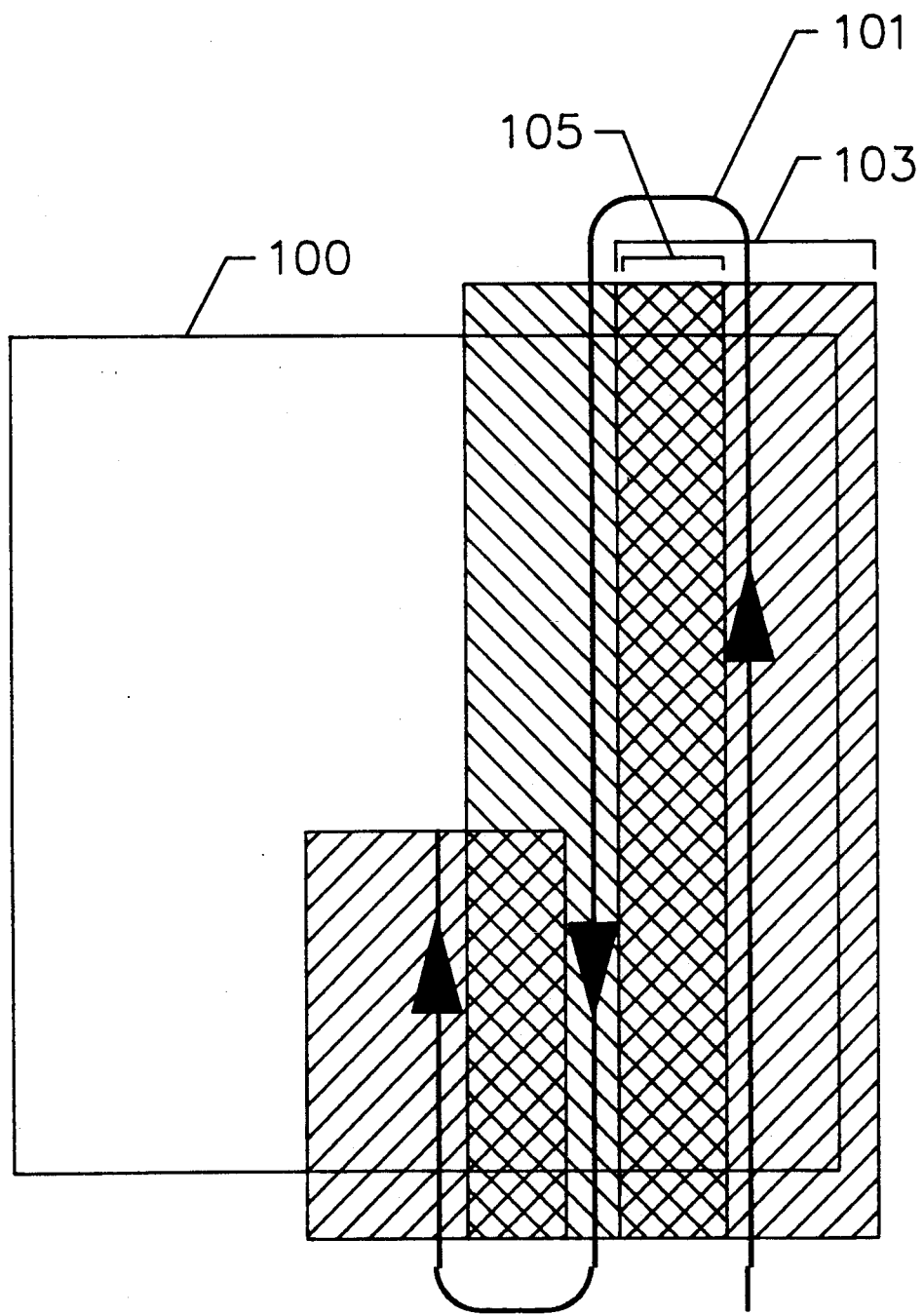
FIG. 5 is a schematic showing sonar track overlap.

Referring now to FIG. 5, a schematic showing sonar track overlap, represents a typical search pattern of a search area 100 that may be implemented with the Sea Scan TM. The ship's track 101 and the estimated swath 103 are plotted on the background plotter. The operator may easily monitor the progress of the search and see the swath overlap 105 on the plotter display.

Figure 6:
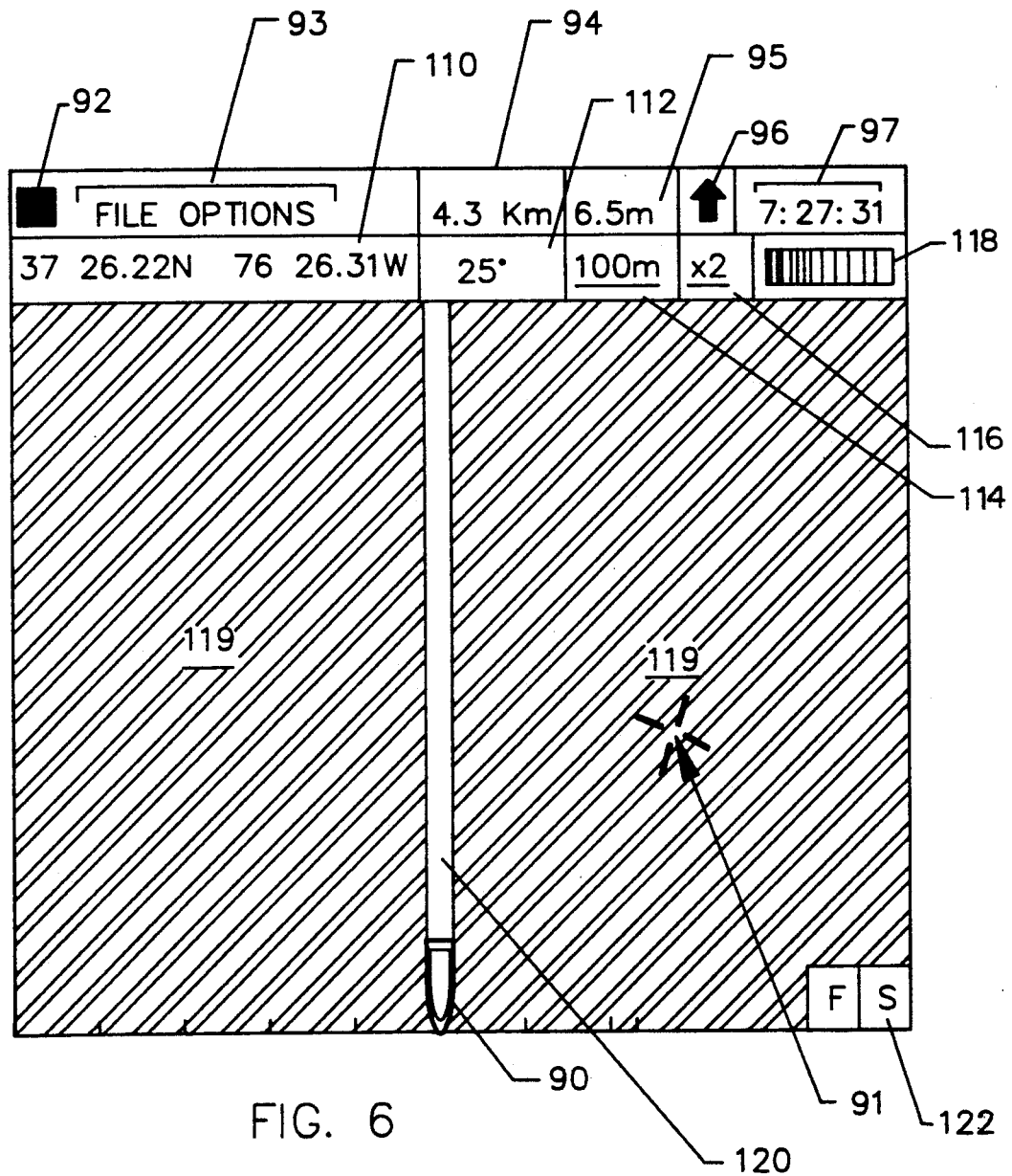
FIG. 6 is a view of the sonar video display.

Referring now to FIG. 6, a view of the sonar video display, the Sea Scan TM screen displays a menu bar and an Information Window. The menu bar contains the alarm on/off indicator 92, the menus 93, the Speed-Over-Ground 94, the Towfish altitude 95, Image Scroll Indicator 96, and the time 97. The Information Window contains the current Latitude and Longitude 110, the Course-Over-Ground 112, swath width setting 114, zoom state 116, and the current color scale 118. At the bottom of the screen is a Ship Direction Indicator 90. It is a useful visual cue for Left/Right, Port/Starboard orientation. The Left (Port) channel data is scrolled up the right side of the screen. The Right channel data is scrolled up the left side of the screen. The left and right sides are separated by a high intensity return column 120 in the middle resulting from the transmit pulse. Permanent range markers that divide the swath into equal eighths are located at the bottom of the screen. The Freeze/Stop indicators 122 are located at the bottom right side of the screen. The sonar image data 119 is displayed below the Information Window.

Boat direction orientation is boat down 90 so that an operator facing rearward toward the position of the towfish will have a proper relation position for targets, that is objects 91 on the right side of the display will appear to the operator's right as he faces rearward.

The advantages of the present invention are numerous. The use of a commercially available computer allows flexible software development. The use of a commercially available computer allows the software developer to test ideas quickly and easily. Also, the use of a commercially available computer greatly simplifies hardware. Further, the use of a commercially available computer makes the stored sonar image data readily available for use by third-party software applications. Further, the system provides the novel features of integration of navigational data directly with the sonar data thereby permitting accurate and repeatable navigation to a sonar target, including return to the sonar target. The integration of the sonar data and navigational data, graphically represented on the plotter, greatly simplifies the prior art search and survey process. Finally, the use of commercially available hardware greatly reduces the cost of the equipment. Many variations will be apparent to those skilled in the art. It is therefore to be understood that, within the scope of the appended claims, the invention may be practiced other than as specifically described.

What is claimed as new and desired to be secured by Letters Patent of the United States is:

1. A side-scanning sonar system comprising:
   a microcomputer;
   a software program for operating said microcomputer which integrates operator control and sonar emitter control with navigational data from an external source;
   an interface circuit card inserted in an expansion slot of said microcomputer and having signal conversion and conditioning elements for control of signal timing and for analog-to-digital signal conversion;
   means for providing navigational data to said microcomputer;
   means for receiving and storing data from said microcomputer;
   a control box receiving ping command output from said interface circuit card and further providing the ping command output as a multiplexed signal with a direct current power signal to a sonar transceiver;
   a sonar transceiver functionally connected to said control box and receiving power and ping commands therefrom and returning sonar return data thereto; and
   a display for presenting processed sonar and navigational data from said microcomputer.

2. A side scanning sonar system as in claim 1 wherein said microcomputer is a personal computer.

3. A side scanning sonar system as in claim 1 wherein said microcomputer is an Apple IIGS TM.

4. A side scanning sonar system comprising:
   a microcomputer for processing operator inputs, control data, navigational data, sonar data and for controlling a sonar towfish;
   a software program for operating the side scanning sonar system;
   means for converting and transmitting said data to and from a sonar transceiver;
   a sonar transceiver receiving power and control data and out-putting raw sonar data to said means for converting transmitting; and
   means for displaying microcomputer processed data.

5. A side-scanning sonar system as in claim 4 wherein said microcomputer is a personal computer.

6. A side-scanning sonar system as in claim 5 wherein said personal computer is an Apple IIGS TM.

7. A side-scanning sonar system as in claim 4 wherein said software program comprises an operator control loop, a navigational data read loop, and a sonar control and read loop and provides integration of sonar and navigational data.

8. A software program as in claim 7 wherein said operator control loop provides operator selectable choices of sonar swath width, and lateral resolution and display sector of total swath width.

9. A software program as in claim 7 wherein said navigational data read loop provides for reading of data from LORAN, DECCA and Global Positioning Systems and other systems with outputs conforming to NMEA 0183 standard.

10. A side scanning sonar system as in claim 4 wherein said means for converting is an interface circuit card having custom signal conditioning circuitry and suitable for insertion into an expansion slot of a personal computer.

11. An interface circuit card as in claim 10 wherein said signal conditioning circuitry includes circuitry to transmit a ping command to a sonar emitter, circuitry to provide timing signals to analog-to-digital convertors and range clock generator, circuitry for control and storage of one line of sonar data.

12. A sonar scanning system as in claim 4 wherein said means for converting and transmitting comprises a control box which provides a ping signal multiplexed with the power signal to a sonar emitter.

13. A control box as in claim 12 wherein said power signal is a low voltage direct current power signal having a voltage below fifty (50) volts.

14. A side scanning sonar system as in claim 4 wherein said sonar emitter is a sonar towfish operated by 28-volt direct current.

15. A side scanning sonar system as in claim 4 wherein said sonar emitter is a sonar towfish.

16. A side scanning sonar system as in claim 4 wherein said means for displaying is a computer video display.

17. A side scanning sonar system as in claim 1 wherein said means for providing navigational data is a standard commercial navigation device having an output compatible with the NMEA 0183 standard.

18. A side scanning sonar system as in claim 1 wherein said means for receiving and storing data is a video recorder.

* * * * *